United States Patent [19]

Henry

[11] 4,112,655
[45] Sep. 12, 1978

[54] END SECTION FOR A RECIPROCATING MOWER

[76] Inventor: Hubert H. Henry, Rte. 2, Bedford, Iowa 50833

[21] Appl. No.: 759,337

[22] Filed: Jan. 14, 1977

[51] Int. Cl.² .......................................... A01D 55/02
[52] U.S. Cl. .................................................... 56/301
[58] Field of Search .................................. 56/296–311

[56] References Cited

U.S. PATENT DOCUMENTS

| 2,700,267 | 1/1955 | McElrath, Sr. | 56/307 |
| 2,909,886 | 10/1959 | Stroburg et al. | 56/296 |
| 3,066,468 | 12/1962 | Kowalik et al. | 56/301 |

Primary Examiner—Russell R. Kinsey
Attorney, Agent, or Firm—Henderson, Strom, Sturm, Cepican & Fix

[57] ABSTRACT

An end section adapted to prevent clogging of the end guard on a reciprocating type mower and having a single point, inner and outer cutting edges, and means of attachment to a conventional mower. The single point design results in economical production of an end section having superior cutting edges which can be easily resharpened when required.

4 Claims, 7 Drawing Figures

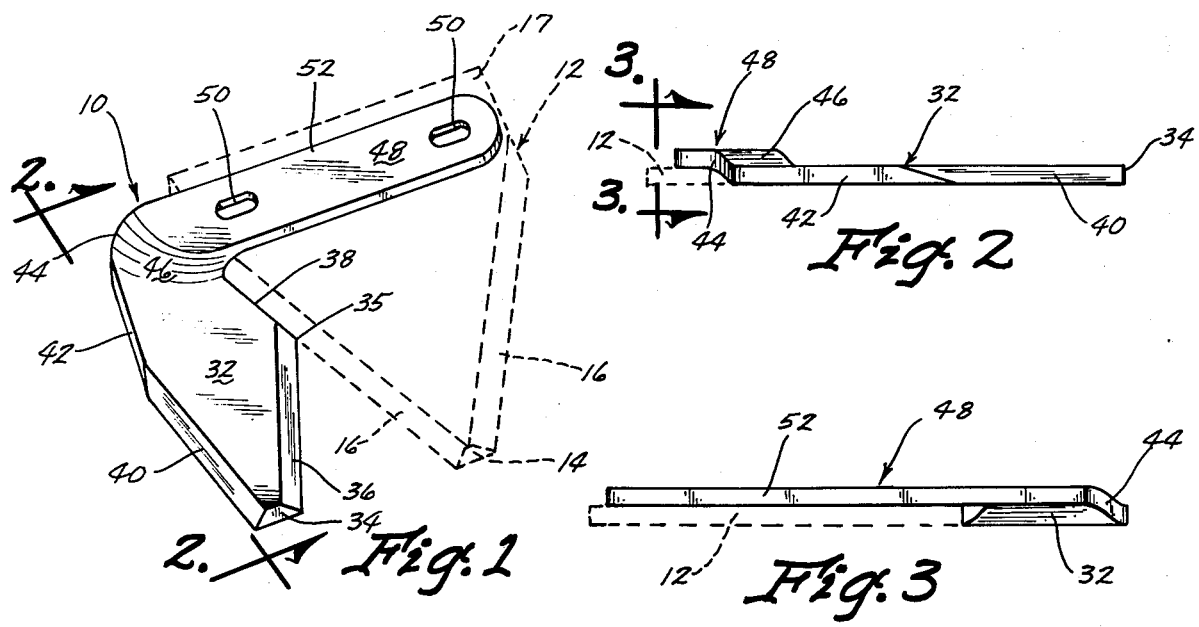
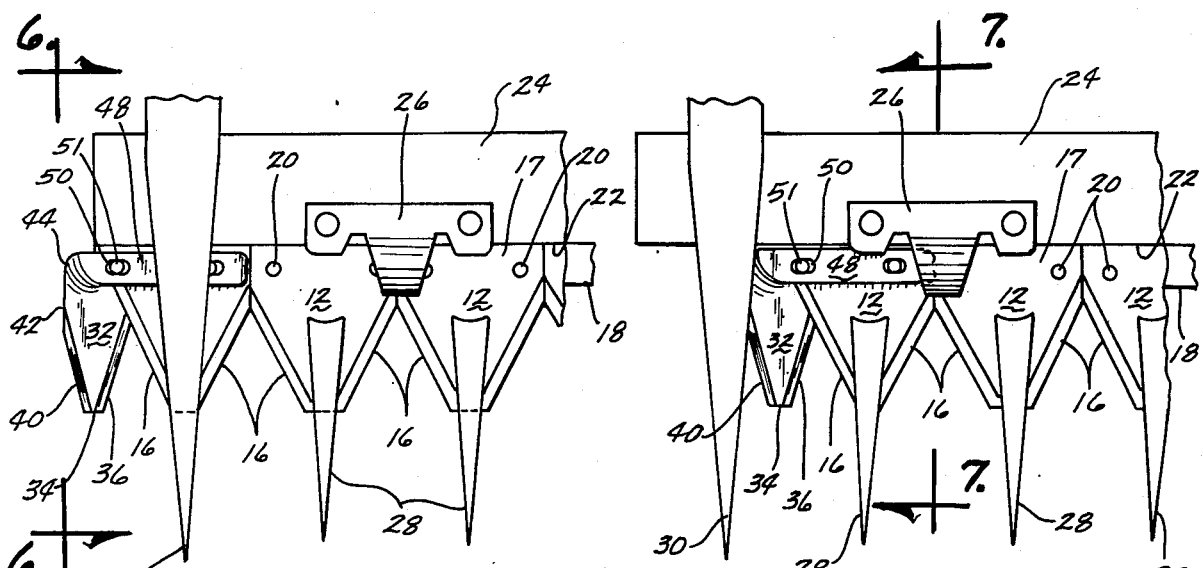
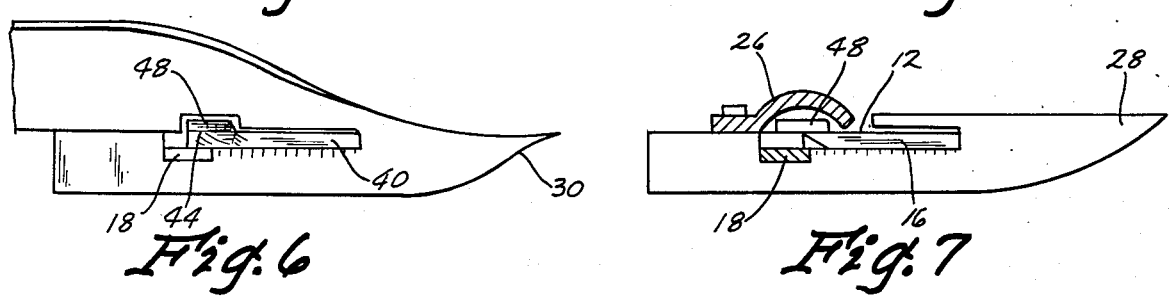

END SECTION FOR A RECIPROCATING MOWER

BACKGROUND OF THE INVENTION

The present invention relates generally to mowers of the reciprocating type and more particularly to a novel end section that prevents clogging of the end guard or shoe of the mower.

Several devices have been used to prevent the clogging of the mower end guard or shoe. Typical devices are those described and illustrated in U.S. Pat. No. 2,909,886 and 3,066,468. These devices, however, are difficult to manufacture and are therefore relatively expensive. Further, the plurality of counter opposing edges which form notches in these devices are difficult to form and sharpen.

In manufacturing the prior art devices, the notches are cut or broached since the configuration of the notches does not lend itself to a typical grinding operation. The cutting operation results in a low quality cutting edge formed by the sides of the notch, thus hampering the operation of the end section. Further, the cutting edges are difficult to resharpen after extended use.

Those concerned with the problems inherent in the prior art devices recognized a need for an end section that would be inexpensive and easy to manufacture. Further, the design of the end section should allow for the manufacture of a section having a quality cutting edge to insure efficient operation of the mower.

SUMMARY OF THE INVENTION

The present invention is a novel end section having a single point and being adapted for attachment to the outboard end of the backing bar of a conventional reciprocating mower. The end section includes a single point formed by two oppositely directed cutting edges and a horizontal strap adapted to extend across and contact the upper surface of the base portion of the adjacent standard sickle section. The portion of the end section including the point and cutting edges is coplanar with the standard section, while the strap portion is formed such that the bottom surface thereof is coplanar with the upper surface of the standard section. Holes are formed in the strap portion to coincide with the holes in the standard section and rivets or other attachment means secure the strap portion and the underlying standard sickle section to the backing bar of the mower.

An object of the present invention is to provide an improved end section.

Another object of the present invention is the provision of an end section that is easy and economical to manufacture.

Another object is to provide an end section having high quality cutting edges that can be easily resharpened.

A further object of the invention is the provision of an end section requiring substantially less material than those of the prior art.

Still another object is to provide an end section that prevents clogging of the end guard of a mowing machine.

Other objects, advantages and novel features of the present invention will become apparent from the following detailed description of the invention when considered in conjunction with the accompanying drawings.

BREIF DESCRIPTION OF THE DRAWINGS

FIG. 1 is a perspective view of the end section with the adjacent standard sickle section shown in phantom;

FIG. 2 is an enlarged side elevation view taken along line 2—2 of FIG. 1;

FIG. 3 is a rear elevation view taken along line 3—3 of FIG. 2;

FIG. 4 is a plan view of a fragment of a mowing machine showing the end section in position when the sickle bar is in the extreme extended position;

FIG. 5 is a plan veiw of a fragment of a mowing machine similar to FIG. 4, but showing the sickle bar in the extreme retracted position;

FIG. 6 is a sectional view taken along line 6—6 of FIG. 4; and

FIG. 7 is a sectional view taken along line 7—7 of FIG. 5.

DESCRIPTION OF THE PREFERRED EMBODIMENT

FIG. 1 illustrates the end section 10 positioned adjacent to a standard sickle section 12, shown in dashed lines. The standard section 12 comprises a point 14 and rearwardly diverging cutting edges 16. As most clearly shown in FIGS. 4 and 5, the standard sections 12 are spaced along the backing bar 18 and attached thereto by rivets 20 secured through holes formed in the base portion 17 of the standard section 12.

The backing bar 18 reciprocates within a channel 22 formed in the mower bar 24 and the sickle sections 12 are held against the mower bar 24 by means of a plurality of hold down clips 26.

The mower bar 24 supports a plurality of forwardly projecting guards 28 and an end guard or shoe 30 which are spaced at equal intervals along the length of the mower bar 24. The backing bar 18 is reciprocated by conventional means and moves between an extreme outward position shown in FIG. 4 and an extreme inward position shown in FIG. 5.

The end section 10, most clearly shown in FIGS. 1-3, has a first portion 32 which has the same thickness as a standard section 12 and when attached thereto lies in the same plane. The first portion 32 includes a single point 34 and an inner cutting edge 36 which extends inwardly and rearwardly from the point 34 to about midway the length of the portion 32 and which point 35 would abut the outboard cutting edge 16 of the adjacent standard section 12 when attached to the section 12. A blunt inner edge 38 extends outwardly and rearwardly from the rearwardmost point 35 of inner cutting edge 36, forming an obtuse angle with the edge 36 as illustrated. When the end section 10 is attached to the section 12, the blunt edge 38 is adapted to mate with the cutting edge 16 such that the first portion 32 fits tightly against standard section 12.

An outer cutting edge 40 extends outwardly and rearwardly from the point 34. As shown in FIG. 4, the inner cutting edge 36 and the outer cutting edge 40 extend from the point 34 at opposite and equal angles from the longitudinal axis of the portion 32 and which is a line normal to the mower bar 24 when joined therewith. A blunt outer edge 42 extends rearwardly from the rearwardmost portion of the outer cutting edge 40 and is parallel to the said longitudinal axis. A rear outboard edge 44 extends inwardly and upwardly from the rearwardmost portion of the blunt outer edge 42, as most clearly shown in FIGS. 2 and 3. The base 46 of the first portion 32 is formed such that it curves upwardly from the plane of the first portion 32.

The end section 10 further includes a second portion or strap 48 which is the same thickness as the first portion 32. The second portion 48 extends from the base 46 normal to the first portion 32 and is disposed parallel to the mower bar 24 (see FIG. 4.) when attached thereto. The second portion 48 is adapted to extend across the base portion 17 of the standard section 12 and the flat bottom surface thereof is coplanar with the upper surface of section 12 when joined therewith. Straight sided elongated holes 50 are formed in the second portion 48 and are adapted to register with the holes 51 in the standard section 12. The holes 50 are elongated to allow for lateral adjustment to insure that the end section 10 mates closely against standard section 12. Rivets or other attachment means are used to secure the second portion 48 and the underlying standard section 12 to the backing bar 18 of the mower.

The straight rearward edge 52 of the second portion 48 is spaced forward of the rear edge of the standard section 12 when attached thereto. As shown in FIGS. 5 and 7, this spacing eliminates interference with the hold down clip 26 when the backing bar 18 is in the extreme retracted position.

In use the end section 10 is mounted on the outboard end of the backing bar 18 together with the standard section 12 as shown in FIGS. 4 and 5. Extra long rivets or other suitable fasteners are used since they must pass through the holes 50 in the second portion or strap 48 and the holes in the underlying standard section 12. If the end section 10 becomes dull or is otherwise damaged it can be removed for sharpening or replacement.

As the backing bar 18 reciprocates, the end section 10 moves back and forth through end guard or shoe 30 as illustrated in FIGS. 4–6. When the backing bar 18 moves from the extreme outward position (FIG. 4) to the extreme inward position (FIG. 5) the first portion 32 is pulled through the end guard 30. The inner cutting edge 36 then cuts through and removes material that may be clogging the end guard 30. When the backing bar 18 moves from the FIG. 5 position to the FIG. 4 position the outer cutting edge 40 and the outboard cutting edge 16 of the standard section 12 are pushed through the end guard 30, thereby cutting and removing clogged materials.

The end section 10 of this invention is superior to the prior art devices in that it requires less material and is simpler and more economical to manufacture. Most importantly, however, the end section 10 has high quality inner and outer cutting edges 36 and 40 made possible by the single point design. Further, the cutting edges 36 and 40 can be easily resharpened by conventional grinding tools.

Obviously, many modifications and variations of the present invention are possible in light of the above teachings. It is therefore to be understood that, within the scope of the appended claims, the invention may be practiced otherwise than as specifically described.

I claim:

1. An end section for a reciprocating type mower, having a mower bar, a backing bar adapted to reciprocate within a channel formed in the mower bar, and a plurality of standard sickle sections spaced along the backing bar and attached thereto, said end section comprising:
   a first portion disposed outwardly of and coplanar with the next adjacent standard sickle section and extending forward of and normal to the mower bar, said first portion including:
   a single point extending forward of the mower bar;
   an inner cutting edge extending inwardly and rearwardly of said point to the outboard cutting edge of the next adjacent standard sickle section;
   a blunt inner edge extending outwardly and rearwardly from the rearwardmost portion of said inner cutting edge along the outboard cutting edge of the next adjacent standard sickle section;
   an outer cutting edge extending outwardly and rearwardly of said point, said inner and outer cutting edges being disposed at opposite and equal angles from a line extending through said point and normal to the mower bar;
   a blunt outer edge extending rearwardly from the rearwardmost portion of said outer cutting edge and disposed normal to the mower bar; and
   a second portion extending inwardly of said first portion and formed above the plane of said first portion such that the lower surface of said second portion is coplanar with and contacts the upper surface of the next adjacent standard sickle section, said second portion having holes formed therein registerable with holes formed in the underlying standard sickle section, for providing attachment of said end section to the backing bar via the next adjacent standard sickle section.

2. The end section of claim 1 wherein said point extends forward of the mower bar substantially the same distance as a point of the next adjacent inboard standard sickle section.

3. The end section of claim 1 wherein the rearward edge of said second portion is disposed parallel to the mower bar and forward of the rearwardmost edge of the underlying standard sickle section.

4. The end section of claim 1 wherein the holes in said second portion are elongated.

* * * * *